Oct. 12, 1926.
T. T. HARRIS
BOLL WEEVIL MACHINE
Filed August 2, 1924
1,602,849
2 Sheets-Sheet 2
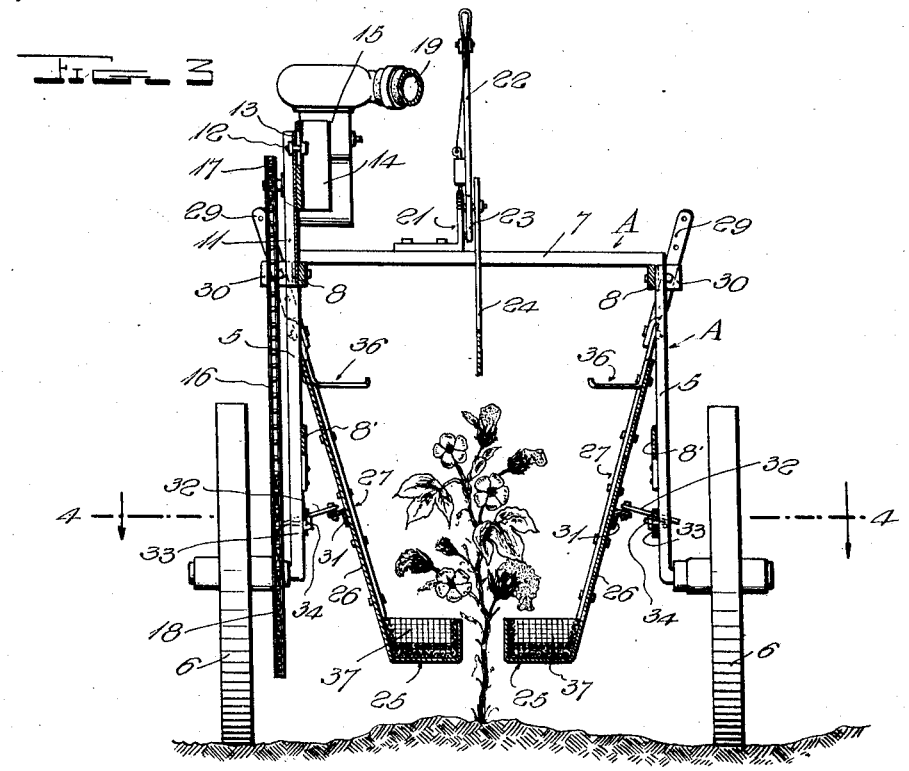
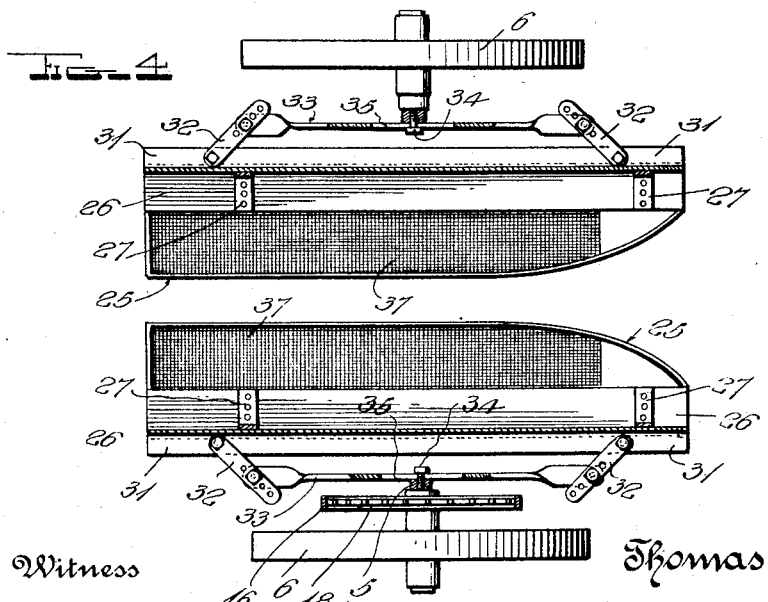
Inventor
Thomas T. Harris, Patented Oct. 12, 1926.

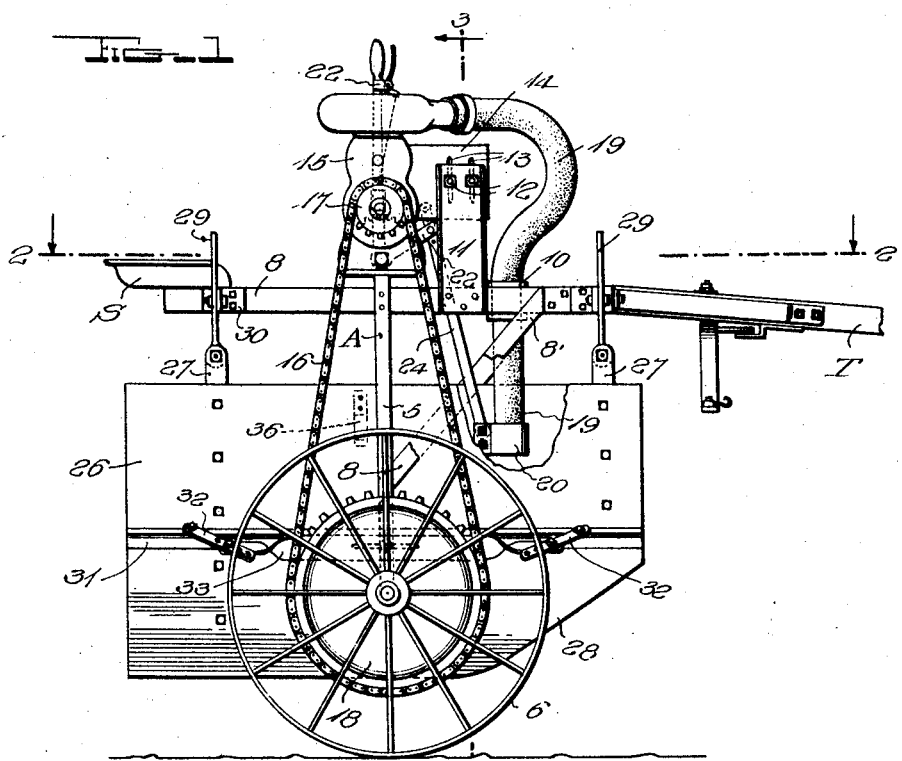

1,602,849

UNITED STATES PATENT OFFICE.

THOMAS T. HARRIS, OF EDENTON, NORTH CAROLINA.

BOLL-WEEVIL MACHINE.

Application filed August 2, 1924. Serial No. 729,837.

This invention relates to improvements in machines for catching and destroying boll weevils, the primary object being to provide pans movable along both sides of rows of cotton plants, just beneath the foliage and a blower arranged above the plants to direct a blast of air through the foliage to blow the boll weevils and punctured cotton squares into the pans, the blower and pans being readily adjustable as conditions of the cotton plants may require.

Another object is to provide in a machine of this character, a blower having an air discharge pipe whose position with respect to the cotton plants may be readily varied from the operator's seat.

It is also an object to provide novel means for taking up slack in the chain which guides the pneumatic blower.

A further object is to so mount a pair of catch pans or receptacles at opposite sides of a row of plants, as to permit variance in the elevation of the pans and in their relative transverse spacing, and to yieldably interconnect the intermediate portion of each pan with the main supporting frame so that the operator may quickly shift the pans laterally at will.

With the foregoing general objects in view, the invention resides in the novel subject matter hereinafter described and claimed, the description being supplemented by the accompanying drawings, wherein:

Figure 1 is a side elevation;

Figure 2 is a horizontal sectional view taken on the line 2—2 of Fig. 1;

Figure 3 is a vertical transverse sectional view taken on the line 3—3 of Fig. 1; and Figure 4 is a horizontal sectional view taken on the line 4—4 of Fig. 3.

In this machine, the main frame comprises an arched or inverted U-shaped axle A whose vertical arms 5 have their lower ends turned outwardly to mount ground or traction wheels 6 which may be of any preferred form. Riveted or otherwise fixed to the upper portion of this axle and preferably between the arms 5 and below the upper cross bar 7 is a horizontally disposed open frame 8 which may be of substantially rectangular formation and made up of a single length of metal whose end portions are bent into parallel relation and bolted together. At this point of connection I preferably mount a seat S to support the operator. Brace or reinforcing bars 8' are preferably arranged to interconnect the side bars 5 of the axle and the longitudinal sides of the frame 8. At the forward end of this frame 8, I arrange a tongue T which carries ordinary whiffle-trees by means of which two horses or mules may be hitched to the machine so that they will walk between adjacent rows. Arranged in advance of the point of connection between the axle and the frame 8 is a transverse bar 9 which reinforces the frame 8 and serves as a support for a flexible hose guide 10 which may be bolted or otherwise secured in position.

A vertical arm 11 preferably formed of channel iron has its lower end bolted or otherwise secured to one of the longitudinal side bars of the frame 8, while its upper end is provided with one or more bolts 12 which pass through vertical slots 13 in a bracket 14 fixed in any preferred manner to one side of a standard type of pneumatic blower 15. This blower is preferably operated by means of a sprocket chain 16 which is trained over a small sprocket wheel 17 on the blower and a relatively large sprocket wheel 18 fixed to the hub of one of the ground wheels 6. Through the aforementioned bolt and slot arrangement, slack may be readily taken up in the sprocket chain 16 as is quite obvious.

The discharge pipe 19 leading from the blower 15 is preferably flexible and extends downwardly through the guide ring 10 and at its outlet end mounts a ring or collar 20 which is designed for attachment to an actuating or adjusting mechanism. This mechanism consists of a pawl and rack device 21 which includes an operating lever 22, this lever having an angular arm 23 whose outer end is adjustably connected to a link 24 whose lower end is fixed to the aforementioned ring or collar 20. This entire operating or adjusting mechanism is preferably fixed to the top or connecting bar 7 of the arched axle as clearly shown in Figs. 2 and 3. It is obvious that due to the flexibility of the hose 19, the adjusting mechanism may be operated to shift the outlet end of the hose vertically and longitudinally with respect to the remaining portions of the machine.

For the purpose of catching the boll weevils or punctured cotton squares blown from the plants over which the machine passes, I provide a pair of receptacles in the form of open-topped elongated pans 25 preferably formed of sheet metal and having their outer side walls extended upwardly to form shields 26 to which supporting arms or bars 27 may be bolted, riveted or otherwise fixed. These pans are adapted to be spaced apart so as to permit straddling of the rows of cotton plants or the like, and in order to guide the plants into the space between these pans, the adjacent side walls are curved outwardly away from each other at the forward end as more clearly shown in Figs. 2 and 4. To minimize probable injury to the plants, I upwardly incline the forward end 28 of each pan or receptacle as shown in Fig. 1. The upper ends of the supporting bars 27 extend beyond the upper edges of the shields 26 and are bolted to the lower ends of relatively short attaching bars 29 which are provided with longitudinally spaced openings for adjustable connection to the longitudinal side bars of the open top frame 8. This adjustable connection is effected by securing to this frame at the four corners, substantially L-shaped brackets 30 preferably formed of angle iron, one of the flanges of each bracket having pivotal bolt connection with the connecting bar 29 as most clearly shown in Fig. 3. With variance of the point of connection between these brackets and the connecting bars 29, it is clear that the height and relative transverse spacing of the pans 25 may be readily varied.

For the purpose of preventing undue movement of the catching pans 25 on their pivots and at the same time permit the operator to quickly shift the pans transversely as occasion may demand, I provide yieldable connection between the intermediate portion of the shield 26 and the adjacent vertical side bars 5 of the arched arm A. This connection consists in securing to the outer face of each shield 26, a horizontally disposed angle iron bar 31 to adjacent end portions of which are loosely pivoted the inner ends of links 32 whose outer ends are provided with a plurality of spaced openings permitting adjustable loose pivotal connection to opposite ends of a spring bar 33. This spring bar 33 preferably is longitudinally adjustably connected to the lower portions of the arched axle by means of a bolt 34 extending into the axle through a longitudinal slot 35 as clearly shown in Fig. 4. Through shifting the point of connection between the links 32 and the spring bar 33, it is clear that the transverse spacing of the pan 25 is varied and it is also evident that this yieldable connection permits shifting of the pans individually on their pivots as desired by the operator who may effect such movement by pressure of his feet upon the stirrups 36.

The pans 25 are adapted to contain crude oil or the like liquid which will kill the boll weevils or other insects which are blown into the pans. In order that the boll weevils or the like may be readily removed from these pans or receptacles, I arrange readily removable liners such as wire baskets 37 which may be easily lifted from the pans, carrying with them the boll weevils and cotton squares but leaving the crude oil or other liquid in the pans for further use. I preferably empty the contents from the baskets 37 and burn the former, after which these baskets may be replaced in the pans for further use.

With a machine of this type, the air discharge pipe and pans may be variably positioned for the removal and catching of boll weevils and punctured cotton squares at various stages of growth of the plants, and due to the yieldable connection between the pan-supporting arms and the arched axle, I may quickly shift the receptacles or catch pans to avoid injury to the plants which would otherwise result due to irregularities in the formation of the rows or unusual development of the foliage.

While I have set forth certain specific structure and such structure has proven exceptionally satisfactory, it is understood that certain changes in the details of construction may be resorted to and such changes as fall within the scope of the appended claims, I consider within the spirit of my invention.

I claim:—

1. In a machine of the character described, a carrying frame, a catch pan supported by said frame, upwardly extending supporting arms pivotally connecting the pan and upper portion of the frame, yieldable means having a loose pivotal connection at its ends with said pan and having its intermediate portion connected with the adjacent portion of said frame, and means for effecting a deposit of boll weevils and the like into said pan.

2. A structure as specified in claim 1; said yieldable means including an elongated spring bar secured intermediate its ends to the lower portion of said frame, and links pivotally and loosely connecting the ends of said bar to said pan.

3. In a machine of the class described a carrying frame, a pair of transversely spaced catch pans pivotally connected to the upper portions of the frame, adjustable yieldable connection between the frame and pans to yieldably hold the pans at a predetermined point, foot actuated means to shift the pans on their pivots, and means adjustably mounted on said frame for effecting deposit of boll weevils or the like into the pans.

4. In a machine of the class described, a carrying frame, a pair of transversely spaced catch pans pivotally connected to the upper portions of the frame, adjustable yieldable connection between the frame and pans to yieldably hold the pans at a predetermined point, stirrups arranged for foot actuation to shift the pans on their pivots, and means for effecting deposit of boll weevils or the like into the pans.

THOMAS T. HARRIS.